United States Patent
Dawson et al.

(10) Patent No.: US 7,657,401 B2
(45) Date of Patent: Feb. 2, 2010

(54) SYSTEMS AND METHODS FOR PREDICTING LOAD TEST RESOURCE REQUIREMENTS

(75) Inventors: Christopher J. Dawson, Arlington, VA (US); Barry M. Graham, Silver Spring, MD (US); Rick A. Hamilton, II, Charlottesville, VA (US); Kent D. Siefkes, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/421,279

(22) Filed: May 31, 2006

(65) Prior Publication Data

US 2007/0282567 A1    Dec. 6, 2007

(51) Int. Cl.
*G06F 11/30* (2006.01)
(52) U.S. Cl. .................................. 702/186
(58) Field of Classification Search ............. 702/186
See application file for complete search history.

(56) References Cited

U.S. PATENT DOCUMENTS

| | | | |
|---|---|---|---|
| 5,675,771 A | 10/1997 | Curley et al. | |
| 6,209,032 B1 | 3/2001 | Dutcher et al. | |
| 6,674,724 B1 | 1/2004 | Main et al. | |
| 2004/0236852 A1* | 11/2004 | Birkestrand et al. | 709/226 |
| 2005/0021310 A1 | 1/2005 | Zeng et al. | |
| 2005/0102121 A1* | 5/2005 | Odhner et al. | 703/1 |
| 2005/0102318 A1* | 5/2005 | Odhner et al. | 707/102 |

OTHER PUBLICATIONS

Microsoft Office 2003 Application Scalability Analysis By Citrix Consulting, Citrix Systems, Inc. 2003, p. 1-34.*
http://www.merriam-webster.com/dictionary, p. 1, May 19, 2008.*
Highly Available and Efficient Load Cluster Management System using SNMP and Web, Myung-Sup Kim, Mi-Jeong Choi and James W. Hong, Dept. of Computer Science and Engineering, Postech, Pohang, Korea, IEEE, 2002, p. 619-632.*
Integrating user-perceived quality into Web server design Nina Bhatti , Anna Bouch , Allan Kuchinsky, Hewlett-Packard Laboratories, 1501 Page Mill Road, Palo Alto, CA 94304, USA, 2000 Published by Elsevier Science B.V., p. 1-16.*
Configuring SNMP, chapter 23, Catalyst 4000 Family, 2948G, 2980G Software Configuration Guide—Rel. 6.2, p. 23-1 to 23-6.*
Simple Network Management Protocol, Internetworking Technologies Handbook, chapter 56, p. 56-1 to 56-12.*
SNMP Monitoring: One Critical Component to Network Management, p. 1-4, 2005 Network Instruments.*
SNMP Management Guide, Feb. 12, 2004, Enterasys Networks.*
Emulate from Merriam-Webster Online Dictionary, May 19, 2009, p. 1.*
Imitate from Merriam-Webster Online Dictionary, May 19, 2009, p. 1.*

* cited by examiner

*Primary Examiner*—Tung S Lau
(74) *Attorney, Agent, or Firm*—William H. Steinberg; Schubert Osterrieder & Nickelson PLLC (57) ABSTRACT

Systems, methods and media for collecting and using machine usage data and machine configuration data are disclosed. In one embodiment, a workbench computer collects historical machine usage data for at least one load test machine emulating a plurality of users to produce a database of historical machine usage data for the at least one machine.

21 Claims, 5 Drawing Sheets

SYSTEMS AND METHODS FOR PREDICTING LOAD TEST RESOURCE REQUIREMENTS

FIELD

The present invention is in the field of computers and servers. More particularly, the invention relates to load testing and predicting load test resource requirements.

BACKGROUND

Many different types of computing systems have attained widespread use around the world. These computing systems include personal computers, servers, mainframes, work stations, and a wide variety of stand-alone and embedded computing devices. Sprawling client-server systems exist, with applications and information spread across many PC networks, mainframes and minicomputers. In a distributed system connected by networks, a user may access many application programs, databases, network systems, operating systems and mainframe applications. Computers provide individuals and businesses with a host of software applications including word processing, spreadsheet, web-publishing, databases, and accounting. Further, networks enable high speed communication between people in diverse locations by way of e-mail, websites, instant messaging, and web-conferencing.

At the heart of every computer, server, workstation and mainframe is a microprocessor. A common architecture for high performance, single-chip microprocessors is the reduced instruction set computer (RISC) architecture characterized by a small simplified set of frequently used instructions for rapid execution. Thus, in a RISC architecture, a complex instruction comprises a small set of simple instructions that are executed in steps very rapidly. These steps are performed in execution units adapted to execute specific simple instructions. In a superscalar architecture, these execution units typically comprise load/store units, integer Arithmetic/Logic Units, floating point Arithmetic/Logic Units, and Graphical Logic Units that operate in parallel. In a processor architecture, an operating system controls operation of the processor and components peripheral to the processor. Executable application programs are stored in a computer's hard drive. The computer's processor causes application programs to run in response to user inputs.

In a typical configuration, computers connect by way of network servers to other computers in a network. The servers facilitate communications between the computers. One example of a network is the Internet which comprises servers serving a great number of computers. Each computer has an Internet Browser to access the servers. In a typical browser session, a user may address different websites, select different links, download information, upload information, etc. Clearly, this activity puts a load on the servers that serve the multitude of users accessing the servers.

One cannot easily predict how many servers are necessary to handle a particular load of computers accessing the servers. To determine performance, a load test may be performed. IBM Rational Performance Tester and competing tools emulate the workload generated by thousands of users accessing the servers. To do this, multiple client-server sessions are generated to emulate user interactions with the server system under test. Each session emulates a client interaction with the system using a plurality of different protocols including, without limitation, Hyper-Text Transfer Protocol, (HTTP), which is a method used to convey information on the World Wide Web. An example of an emulated interaction is to send an initial HTTP request and process the HTTP results that are returned.

An object of a load test is to determine how many users a server system can serve simultaneously without encountering a response time which is deemed to be too slow. One load test machine alone does not always have the capacity to handle the concurrent throughput rate of the many emulated requests that may be needed in a load test. Thus, in current implementations the load is distributed over a plurality of load test machines. Each of the plurality of load test machines is an agent of a workbench computer which controls the load test machines. The workbench computer enables the test designer to specify the number and type of load test machines and to specify the number of users emulated by each. A problem arises that the test designer doesn't have precise information about how many users can be emulated by a load test machine without exceeding process limits. Thus, currently the user must use guess work and intuition.

What is needed is a method for collecting and providing historical machine usage data that will inform a test designer concerning the number and type of load test machines to be employed for a load test and how many users will be emulated by each machine.

SUMMARY

The problems identified above are in large part addressed by systems, methods and media for collecting load test data for use in designing a load test. One embodiment is a method for determining load test resources for a load test of one or more servers using one or more load test machines. The method comprises collecting historical machine usage data for at least one load test machine. The at least one load test machine emulates numbers of users to produce a database of historical machine usage data for the at least one machine. The method further comprises determining from the historical machine usage data in the database a number of users that can be emulated by the at least one machine, without exceeding specified process limits.

In one embodiment, the method may comprise collecting machine configuration data to associate with the historical machine usage data of a machine to produce a database comprising machine configuration data associated with historical machine usage data for each of one or more load test machines. The method may further comprise storing the type of operating system executed by each load test machine and storing the type of processor of each load test machine. Some embodiments further comprise determining a minimum number of load test machines needed to emulate a specified total number of users without exceeding the specified process limits. The specified process limits may comprise a maximum average CPU usage and maximum memory usage. Historical machine usage data may also comprise average and maximum CPU usage data and average and average and maximum memory usage data.

Embodiments include a computer configurable to execute load test software. Some embodiments comprise memory to store instructions to be executed by a processor to perform load test functions and memory to store machine usage data collected from a plurality of load test machines. Such embodiments further comprise a processor coupled with the memory to execute the stored instructions to determine from the machine usage data a number of emulated users to be emulated for each load test machine without exceeding process limits.

Another embodiment of the invention provides a machine-accessible medium containing instructions effective, when executing in a data processing system, to cause the system to perform a series of operations. The series of operations comprise receiving load test machine usage data from one or more load test machines. Load test machine usage data is stored in memory and associated with load test machine configuration data stored in memory. The series of operations further comprise determining from the load test machine usage data a number of users that may be emulated by a load test machine without exceeding specified process limits for a specified load test machine configuration.

BRIEF DESCRIPTION OF THE DRAWINGS

Advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Systems, methods and media for collecting and using machine usage data and machine configuration data are disclosed. In one embodiment, a workbench computer collects historical machine usage data for at least one load test machine emulating a plurality of users to produce a database of historical machine usage data for the at least one machine.

Figure 1:
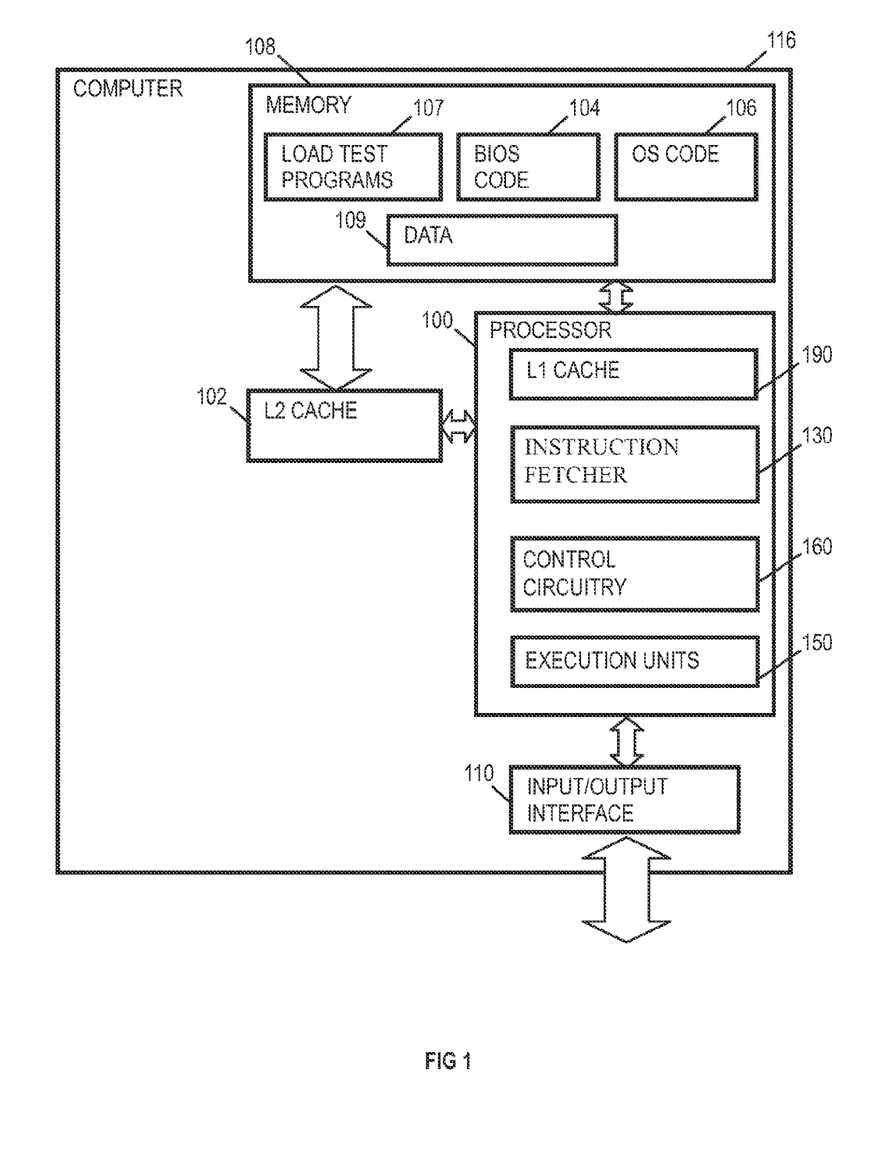
FIG. 1 depicts a block diagram of a computer for executing load test software.
Figure 1A:
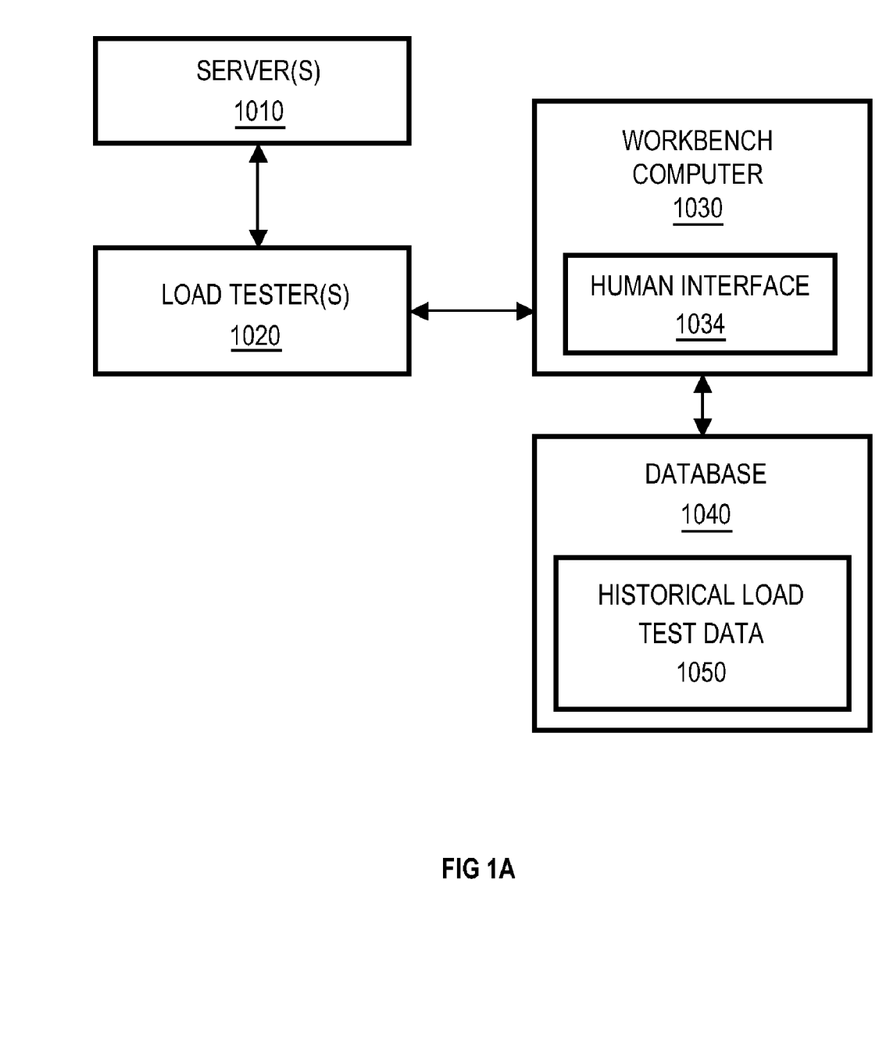
FIG. 1A depicts an embodiment of systems for collecting load test data and performing load tests.

FIG. 1A shows a test configuration for load testing according to embodiments described herein. One object of a test is to determine how many users a server may support before becoming too slow. Accordingly, one or more servers 1010 are connected to one or more load testing machines 1020. Load testers 1020 emulate multiple users accessing the servers. One measurement of a test performed by a load tester 1020 is a response time which is the time between a request and a response to the request. That is, a load tester 1020 submits a request to the server and measures the time it takes to receive a response from the server. As the number of emulated users increases, the response time of a server to a request from a user increases. The maximum number of users that the server can support is determined when the response time approaches a specified threshold. Thus, the test determines whether the server can support a certain number of users with a tolerable response time.

Thus, response times are measured by the load testers 1020. This information is provided to a workbench computer 1030. Workbench computer 1030 comprises a human interface 1034, which may typically comprise a keyboard, mouse, and video monitor to enable a person to interactively set up and conduct a test. Workbench computer 1030 may determine, based on input from a test designer, which load testers 1020 will be used in a load test and how many users will be emulated by each load tester 1020. During a test in which one or more load testers are emulating users, workbench 1030 will receive machine usage data from load testers 1020. This usage data may comprise the CPU usage of a load tester in the course of emulating a plurality of users, memory usage, disk usage, network usage, and other useful information.

The machine usage data gathered by workbench computer 1030 is stored in a database 1040. Database 1040 comprises historical load test data 1050. Historical load test data comprises historical machine usage data and machine configuration data associated therewith. Test personnel may use the information 1050 in database 1040 to determine what load each of a plurality of different load testers can emulate without over utilization of a processor or memory of the load tester. The data base of historical load test data may be stored on a hard drive of workbench computer 1030 or may be implemented separately as shown in FIG. 1A. Workbench computer 1030 enables the test designer to visually and selectively access database 1040. Thus, workbench computer 1030 comprises a video monitor, a key board, a mouse, and a central processor. Workbench computer 1030 executes software to store and retrieve data from the data base and to aggregate and display information supplied to it from the one or more load testers 1020. Ideally, a window displayed on the video monitor of computer 1030 allows the tester to select and configure one or more load testers for a load test.

Associated with each load tester 1020 is a set of historical machine usage data that tells a person designing a load test how many users a load tester can emulate without exceeding specified process limits. For example, one may wish to ensure that the CPU usage of a processor of a load tester does not exceed 70%, or that memory usage does not exceed 80% during a load test. The number of users that may be emulated within these constraints may be determined from the historical machine usage data stored in data base 1040. To accumulate historical data, the load test designer runs one or more tests, each time increasing the number of users emulated by a load tester whose capacity is to be determined. Then, when executing a new test, the workbench computer 1030 uses historical data to determine the number of load testers needed to stay within the specified process limits.

Thus, a test designer may first perform initial data collection to gather historical data to be stored in a database, if that data does not already exist as a result of a previous collection of historical data. Then, at the time of designing a load test, the stored historical data is accessed to determine load tester process limits. More specifically, for example, the historical data may comprise a processor usage per number of users emulated by a load tester. Further, the historical data may comprise a memory usage per number of users emulated. Prior to running a new load test, the test designer will specify a total number of users and may additionally specify a pool of available machines comprising one or several configurations, (e.g., two different operating systems). Based on the historical data, the workbench computer 1030 would set the configurations and determine a number of load machines required and a total number of users to be emulated by each machine.

The person implementing data collection to provide a historical database may configure the test network to include at least one of each type of machine that can be used as a load tester. Because the choice of operating system may affect performance, two identical machines running different operating systems are, for test and data collection purposes, two different machines. Once the data collector chooses the load test machines to configure, and once each load tester is configured, load testing begins. To begin, the data collector may configure each load tester to emulate about 10 users, for example. Then each load tester simultaneously emulates the interaction of multiple users with the one or more servers 1010. At the completion of the load test, the workbench computer 1030 collects machine usage information from each load tester.

The information collected by workbench computer 1030 may comprise data for a given number of emulated users for each load tester. For example, a test may be run with 10 emulated users per load testing machine. During the test, workbench computer 1030 compiles machine usage data that may comprise, for each machine: CPU utilization, memory utilization, paging space, disk usage, network usage, etc. This information for each machine may be categorized according to machine configuration, including operating system, processor speed, processor type, number of processors, amount and type of physical memory, etc. Also, workbench computer 1030 may compile the throughput per type of machine based on type of activity of emulated user. A test run is then repeated, increasing the number of emulated users per machine by 10, for example. This is repeated until load tester capacity begins to exceed specified limits, or until a specified number of emulated users is reached.

The information collected by workbench computer 1030 may be stored in a local folder of workbench computer 1030 (e.g., on its hard drive) or in data base 1040 or both. In addition, or alternatively, the historical data may be stored on one or more of servers 1010, retrievable by workbench computer 1030 from server(s) 1010. Thus, for example, the folder may be stored in a server on a customer's network.

Once historical data is compiled, a test designer may access the data and use it to make decisions regarding what machines should be used as load testers, and how these machines should be configured. Thus, the test designer may configure load testers 1020, via workbench computer 1030. Each load tester 1020 emulates a plurality of users under an operating system. The emulation of a user may be obtained from first recording an actual user session wherein the user accesses one or more locations or functions provided by servers 1010. Then, during emulation, the system plays back the recorded user session.

The test designer may specify, for example, how many machines 1020 will operate under a first operating system and how many will operate under a second operating system, etc. The test designer may further assign to each machine a number of users to emulate that should not exceed process limits specified for the machine under a given operating system. The number of emulated users specified for a machine under a given operating system may be derived from historical data. If for a given machine, historical data is not available, then data about the machine can be collected as described above.

In one embodiment, a partially aggregated approach may be implemented. In the partially aggregated approach, each load testing machine 1020 that is part of a load test to collect data delivers information to workbench 1030. The information may comprise average and peak values of CPU usage, memory usage, disk usage, etc. The information may further comprise a standard deviation or variance from a mean value, and other statistical information computed by a machine 1020. Workbench computer 1030 populates database 1040 with the information reported to it by machines 1020. Workbench computer 1030 may also compute data from the information reported by machines 1020. In one embodiment, workbench computer 1030 computes statistical information from machine usage information continually reported to it. In either case, the partially aggregated approach provides for population of database 1040 by workbench computer 1030 with information concerning the configuration of each machine 1020 and metrics that indicate machine usage. In another embodiment, a fully distributed approach may be implemented. In a fully distributed approach, each load testing machine populates database 1040 directly with a unique identifier, machine configuration (e.g., operating system), and machine usage data.

A test designer may utilize the compiled historical machine usage data in different ways. For example, in one embodiment, the test designer specifies, by way of workbench computer 1030, a total number of users and also specifies machine configuration data such as operating systems to be used, processor speeds, processor types, etc. Further, the designer may specify machine usage limits such as maximum average CPU utilization, maximum average memory utilization, etc. Then, workbench computer 1030, operating under the directions of computer code, may choose a configuration of a plurality of load testing machines 1020. The configuration may comprise, for example, the minimum number of load testing machines 1020 for each specified operating system and processor type that must be employed, including how many users are emulated by each machine without exceeding machine usage limits.

In one embodiment, the test designer may accept, reject, or modify the configuration proposed by workbench computer 1030. When the test designer achieves and accepts a desired configuration of load testing machines 1020, workbench computer 1030 may then configure the selected machines. Thus, workbench computer 1030 may address each selected machine and pass to each machine its assigned number of users to emulate in the load test, as well as other parameters.

Each load testing machine 1020, and workbench computer 1030, may comprise a computer as shown in FIG. 1. Computer 116 comprises a processor 100 that can operate according to BIOS (Basis Input/Output System) Code 104 and Operating System (OS) Code 106. The BIOS and OS code is stored in memory 108. The BIOS code is typically stored on Read-Only Memory (ROM) and the OS code is typically stored on the hard drive of computer system 116. Computer 116 comprises a level 2 (L2) cache 102 located physically close to processor 100. Memory 108 also stores other programs for execution by processor 100, including load test programs 107. Memory 108 also stores data 109.

Processor 100 comprises an on-chip level one (L1) cache 190, an instruction fetcher 130, control circuitry 160, and execution units 150. Level 1 cache 190 receives and stores instructions that are near to time of execution. Instruction fetcher 130 fetches instructions from memory. Execution units 150 perform the operations called for by the instructions. Execution units 150 may comprise load/store units, integer Arithmetic/Logic Units, floating point Arithmetic/Logic Units, and Graphical Logic Units. Each execution unit comprises stages to perform steps in the execution of the instructions fetched by instruction fetcher 130. Control circuitry 160 controls instruction fetcher 130 and execution units 150.

Computer 116 also typically includes other components and subsystems not shown, such as: a Trusted Platform Module, memory controllers, random access memory (RAM), peripheral drivers, a system monitor, a keyboard, a color video monitor, one or more flexible diskette drives, one or more removable non-volatile media drives such as a fixed disk hard drive, CD and DVD drives, a pointing device such as a mouse, and a network interface adapter, etc. Computers 116 may include personal computers, workstations, servers, mainframe computers, notebook or laptop computers, desktop computers, or the like. Processor 100 communicates with other computers, servers, and devices by way of Input/Output Interface 110. Thus, computer 116 may be in a network of computers such as the Internet and/or a local intranet. Further, I/O interface 110 may provide access to other memory comprising tape drive storage, hard disk arrays, RAM, ROM, etc.

In one mode of operation of computer 116, L2 cache 102 receives from memory 108 data and load test instructions expected to be processed in the processor pipeline of processor 100. L2 cache 102 is fast memory located physically close to processor 100 to achieve greater speed. The L2 cache receives from memory 108 the instructions for a plurality of instruction threads. Such instructions may include load and store instructions, branch instructions, arithmetic logic instructions, floating point instructions, etc. L1 cache 190 is located in the processor and contains data and instructions preferably received from L2 cache 102. Ideally, as the time approaches for a program instruction to be executed, the instruction is passed with its data, if any, first to the L2 cache, and then as execution time is near imminent, to the L1 cache.

Execution units 150 execute the instructions received from the L1 cache 190. Each of the units may be adapted to execute a specific set of instructions. Instructions can be submitted to different execution units for execution in parallel. Data processed by execution units 150 are storable in and accessible from integer register files and floating point register files (not shown.) Data stored in these register files can come from or be transferred to L1 cache 190 or an external cache or memory. The processor can load data from memory, such as L1 cache, to a register of the processor by executing a load instruction. The processor can store data into memory from a register by executing a store instruction.

A processor 100 within a computer 116 can execute load test software 107. For a computer used as a load test machine 1020, load test software comprises computer instructions to cause the computer to emulate to a server a plurality of users. For example, the computer may emulate a plurality of independent client browser sessions with one or more sites on the Internet. Further, a load test machine will watch its own performance by periodically or occasionally executing an Application Program Interface (API) to determine such parameters as CPU usage, memory usage, disk usage, etc.

For a computer used as a workbench computer 1030, load test software comprises computer instructions to cause the computer to enable the set up of a load test configuration of machines 1020. Further, load test software stored in memory 108 of workbench computer 1030 comprises instruction to cause the computer to collect data from load test machines 1020 and use that data to populate database 1050.

Thus, load test machines 1020 and workbench computer 1030 comprise a plurality of computers such as shown in FIG. 1. Each load test machine, and workbench computer 1030, comprises its own memory for storing its operating system, BIOS, and the code for executing load tests, as well as files and data. Memory of a computer comprises Read-Only-Memory (ROM), cache memory implemented in DRAM and SRAM, a hard disk drive, CD drives and DVD drives.

Figure 2:
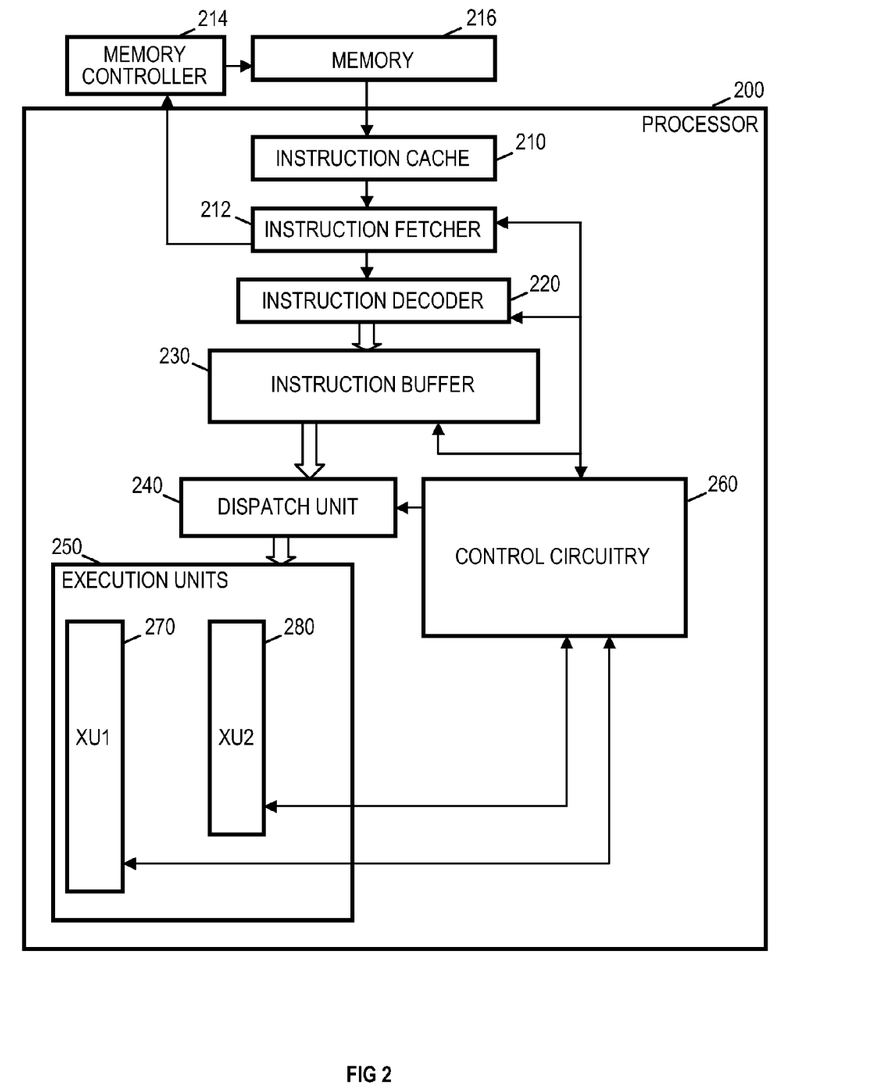
FIG. 2 depicts an embodiment of a processor within a computer that may be configured to perform load test functions.

FIG. 2 shows an embodiment of a processor 200 that can be implemented in a computer such as computer 116 to execute load test software as described herein. The processor 200 of FIG. 2 is configured to execute instructions of load test software to provide the functionality depicted in FIG. 1A and described herein. A level 1 instruction cache 210 receives instructions from memory 216 external to the processor, such as level 2 cache. Thus, software for performing load tests may be stored in memory as an application program. Groups of sequential instructions of the software for performing load test functions can be transferred to the L2 cache, and subgroups of these instructions can be transferred to the L1 cache.

An instruction fetcher 212 maintains a program counter and fetches load test instructions from L1 instruction cache 210. A program counter of instruction fetcher 212 comprises an address of a next instruction to be executed. Instruction fetcher 212 also performs pre-fetch operations. Thus, instruction fetcher 212 communicates with a memory controller 214 to initiate a transfer of load test instructions from a memory 216 to instruction cache 210. The place in the cache to where an instruction is transferred from system memory 216 is determined by an index obtained from the system memory address.

Sequences of load test instructions are transferred from system memory 216 to instruction cache 210 to implement load test functions. For example, a sequence of instructions may instruct processor 200 to receive into its registers data for a load test. This data may comprise a number of users to emulate for a given load test machine. Instructions may further instruct processor 200 to execute the emulation steps of a plurality of users accessing a plurality of network sites. More particularly, instructions may comprise, for each of a plurality of users, accessing a network site (e.g., a website), accessing links within a network site, downloading data from a site, sending data to a site, etc.

In a workbench computer, load test instructions may comprise collecting historical machine usage data for at least one load test machine, the at least one load test machine to emulate numbers of users, to produce a database of historical machine usage data for the at least one machine. The instructions may further comprise determining from the historical data in the database a number of users that can be emulated by the at least one machine, without exceeding specified process limits. The load test instructions may further comprise collecting machine configuration data to associate with the historical machine usage data of a machine to produce a database comprising machine configuration data associated with historical machine usage data for each of one or more load test machines.

Instruction fetcher 212 retrieves load test instructions passed to instruction cache 210 and passes them to an instruction decoder 220. Instruction decoder 220 receives and decodes the instructions fetched by instruction fetcher 212. Instruction buffer 230 receives the decoded instructions from instruction decoder 220. Instruction buffer 230 comprises memory locations for a plurality of instructions. Instruction buffer 230 may reorder the order of execution of instructions received from instruction decoder 220. Instruction buffer 230 therefore comprises an instruction queue to provide an order in which instructions are sent to a dispatch unit 240.

Dispatch unit 240 dispatches load test instructions received from instruction buffer 230 to execution units 250. In a superscalar architecture, execution units 250 may comprise load/store units, integer Arithmetic/Logic Units, floating point Arithmetic/Logic Units, and Graphical Logic Units, all operating in parallel. Accordingly, FIG. 2 shows two execution units 270 and 280. Dispatch unit 240 therefore dispatches instructions to some or all of executions units 250 to execute the instructions simultaneously. Execution units 250 comprise stages to perform steps in the execution of instructions received from dispatch unit 240. Data processed by execution units 250 are storable in and accessible from integer register files and floating point register files not shown. Thus, instructions are executed sequentially and in parallel.

FIG. 2 also shows control circuitry 260 to perform a variety of functions that control the operation of processor 200. For example, an operation controller within control circuitry 260 interprets the OPCode contained in an instruction and directs the appropriate execution unit to perform the indicated operation. Also, control circuitry 260 may comprise a branch redirect unit to redirect instruction fetcher 212 when a branch is determined to have been mispredicted. Control circuitry 260 may further comprise a flush controller to flush instructions younger than a mispredicted branch instruction. Branches may arise from performing a plurality of load test functions. For example, determining if process limits are exceeded by a given number of emulated users involves a branch instruction. If process limits are not exceeded, then the number of emulated users might be increased, and a new load test might be performed. If however, process limits are exceeded, data collection may cease. Control logic for executing branch instructions is thus provided by control circuitry 260.

Figure 3:
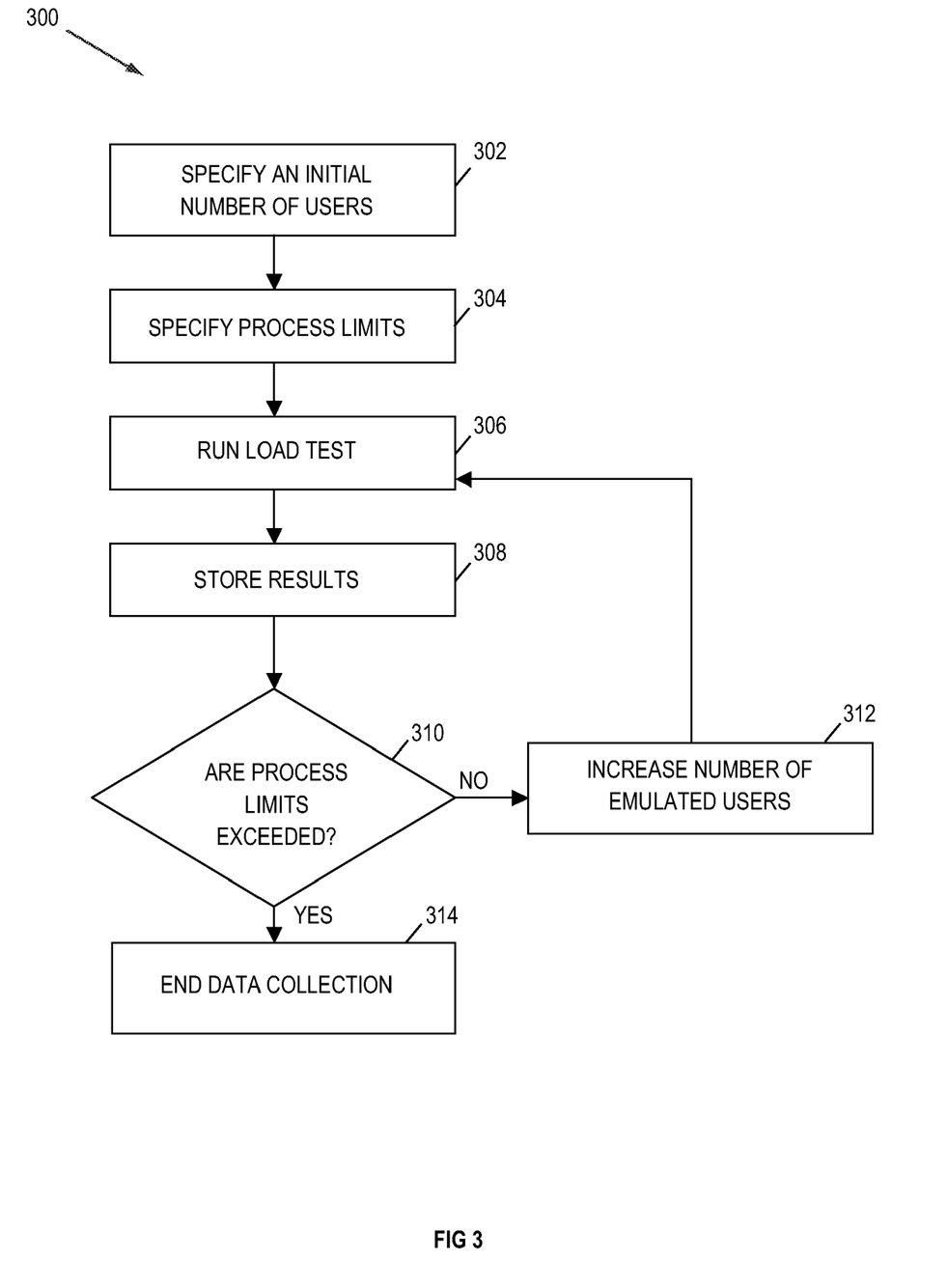
FIG. 3 depicts a flowchart of an embodiment for collecting load test data.

FIG. 3 shows an example flow chart 300 of an embodiment for collecting historical load test data. First, a data collector may specify an initial number of users to be emulated by each of one or more load test machines (element 302). The data collector also specifies process limits (element 304) that, if exceeded, signify an overload of the processor for load test purposes. For example, the data collector may specify the maximum average CPU usage to be 70% and the maximum average memory usage to be 80% for each load test machine. Once the data collector specifies this initial information, the system performs a load test (element 306).

Then, the load test results are stored (element 308). These results may include: the response times of the one or more servers involved in the load test; the average CPU usage, average memory usage, average disk usage, etc, for each machine and for the given number of users emulated by the machine. The results might further include, peak usage values as well as standard deviations from mean values. With the stored usage information, the system can determine if process limits are exceeded (element 310). For example, the system may determine that a specified maximum average CPU usage of 75% has been exceeded. If so, then data collection may come to an end (element 314). If the process limits are not exceeded, then the number of users to be emulated in a next load test is increased (element 312). Then, a new load test is conducted (element 306), now with the increased number of emulated users.

Figure 4:
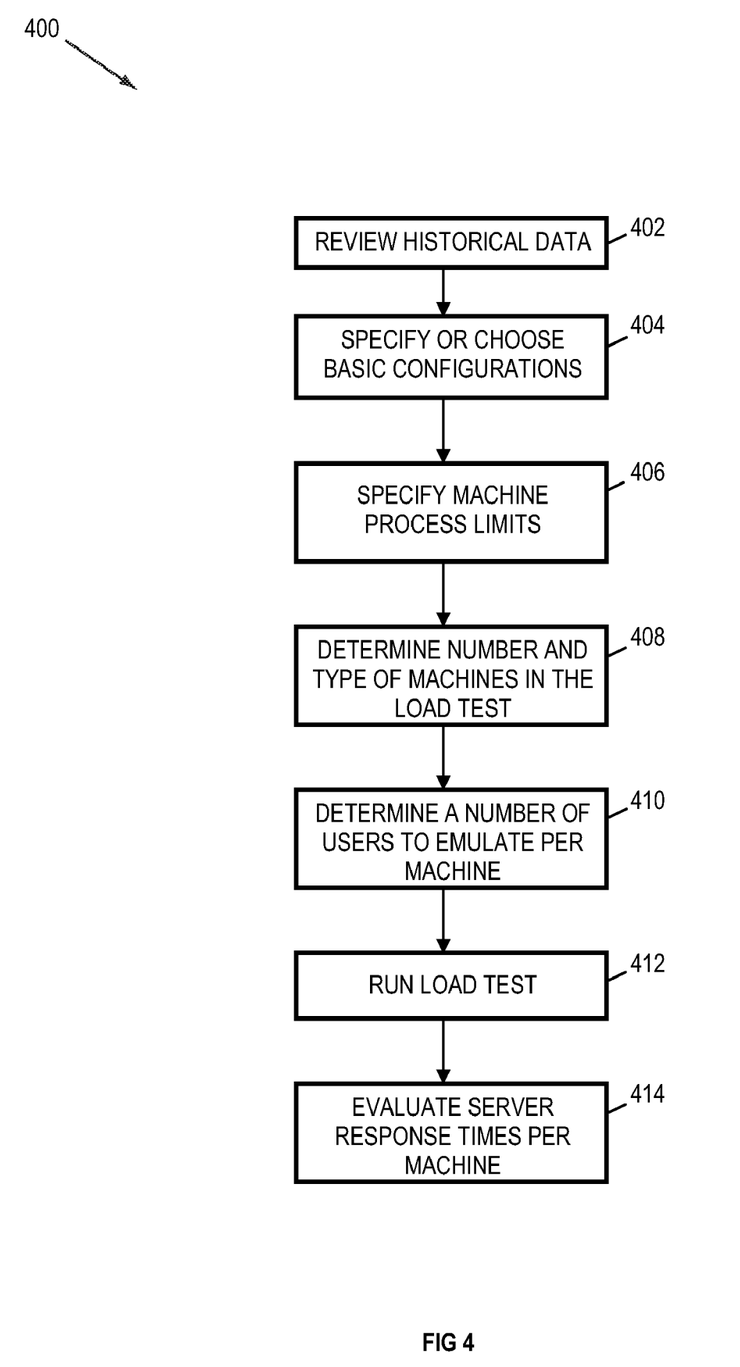
FIG. 4 depicts a flowchart of an embodiment for using historical load test data to design a load test.

FIG. 4 shows an example flowchart 400 of an embodiment for using historical data to construct and conduct a load test. The test designer, at first, or indeed, at anytime in the process, may view historical data previously compiled in a database (element 402). The system may display historical data, for example, in a table with one or more columns containing the types of machine configurations for which data has been compiled, and one or more columns and rows showing the compiled data. For example, the system user may cause to be displayed on a video monitor of a workbench computer, a table or graph of a machine usage parameter versus number of emulated users. Thus, the system presents the test designer with historical data by which he or she may intelligently choose basic configuration types to be used in the load test (element 404). Further, the system presents the test designer with historical data by which he or she may intelligently specify process limits (element 406). Given information specified by the test designer, the workbench computer determines a number of machines of each type to use in the load test (element 408). The workbench computer further determines the number of users to be emulated by each machine (element 410). Finally, the system performs the load test (element 412) and evaluates server response time (element 414).

The invention can take the form of an entirely hardware embodiment, an entirely software embodiment or an embodiment containing both hardware and software elements. In one embodiment, the invention is implemented in software, which includes but is not limited to firmware, resident software, microcode, etc. Furthermore, embodiments can take the form of a computer program product accessible from a machine accessible readable medium providing program code for use by or in connection with a computer such as shown in FIG. 1, or any instruction execution system. For the purposes of this description, a machine accessible or computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a machine accessible medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus, such as shown in FIG. 1. The memory elements can include local memory 108 employed during actual execution of the program code, bulk storage, and cache memories 102, 190, which provide temporary storage of at least some program code in order to reduce the number of times code must be retrieved from bulk storage during execution. Input/output or I/O devices 110 (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Thus, another embodiment of the invention provides a machine-accessible medium containing instructions effective, when executing in a data processing system, to cause the system to perform a series of operations comprising receiving load test machine usage data from one or more load test machines. The operations further comprise storing into a memory the load test machine usage data and associating the load test machine usage data with load test machine configuration data stored in the memory. The operations also comprise determining from the load test machine usage data a number of users that may be emulated by a load test machine without exceeding specified process limits for a specified load test machine configuration. The operations may further comprise determining a minimum number of load test machines to emulate a total number of users without exceeding specified process limits. The operations may further comprise providing a display of machine configuration data and machine usage data. The operations may further comprise enabling a user to choose among a plurality of configuration options for configuring load test machines for a load test, the configuration options informed by historical machine usage and configuration data.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for determining resources for a load test of one or more servers using one or more load test machines, comprising:
    collecting historical machine usage data of at least one load test machine, the at least one load test machine to emulate numbers of users accessing the one or more servers, to produce a user-accessible database of historical machine usage data for the at least one load test machine; the historical usage data comprising a number of users that can be emulated by a load test machine within specified load test machine process limits;
    determining by a user, from the historical machine usage data in the user-accessible database, a number of users accessing the one or more servers that can be emulated by the at least one load test machine within specified load test machine process limits;
    designing a subsequent load test using the historical machine usage data; and
    emulating the determined number of users by the at least one load test machine to perform the subsequent load test designed using the historical machine usage data, the emulating comprising generating multiple client-server sessions to emulate user interactions with the one or more servers.

2. The method of claim 1, further comprising collecting machine configuration data to associate with the historical machine usage data of a load test machine to produce a user-accessible database comprising load test machine configuration data associated with historical machine usage data for each of one or more load test machines.

3. The method of claim 1, further comprising determining a minimum number of load test machines needed to emulate a specified total number of users within specified load test machine process limits.

4. The method of claim 1, wherein collecting historical machine usage data comprises collecting average load test machine CPU usage data.

5. The method of claim 1, wherein collecting historical machine usage data comprises collecting average load test machine memory usage data.

6. The method of claim 1, wherein collecting historical machine usage data of at least one load test machine comprises collecting historical machine usage data of at least one load test machine, the historical machine usage data comprising one or more of CPU utilization of a load test machine for a given number of emulated users, memory utilization of a load test machine for a given number of emulated users, paging space utilized by a load test machine for a given number of emulated users, and disk usage of a load test machine for a given number of emulated users.

7. The method of claim 1, wherein the emulating comprises:
    recording an actual user session wherein the user accesses one or more locations or functions provided by the one or more servers; and
    playing back the recorded user session.

8. The method of claim 1, wherein the collecting comprises:
    performing initial data collection to gather historical machine usage data of one of the at least one load test machine, when the historical machine usage data of the one load test machine does not exist, the performing comprising running a series of tests of machine usage data for the one load test machine, wherein:
        the number of users emulated by the one load test machine increases for each test in the series of tests, and
        the series of tests is continued until the one load test machine meets or exceeds specified limits of the one load test machine.

9. The method of claim 1, wherein the collecting comprises collecting historical machine usage data of at least one load test machine, the historical usage data comprising throughput per type of machine based on type of activity of emulated user.

10. The method of claim 1, further comprising measuring a response time between a request to one of the one or more servers and the response time of the server to the request.

11. The method of claim 2, wherein collecting load test machine configuration data comprises storing the type of operating system executed by each load test machine.

12. A computer configurable to execute load test software for testing a server, comprising:
    memory to store instructions to be executed by a processor and memory to store user-accessible load test machine usage data collected from one or more load test machines; the load test machine usage data comprising a number of users that can be emulated by each load test machine within specified load test machine process limits, wherein emulating a user by a load test machine comprises generating multiple client-server sessions to emulate user interactions with the one or more servers; and
    a processor coupled with the memory to execute the stored instructions to enable a user to determine from the user-accessible load test machine usage data a number of users that may be emulated accessing a server by a load test machine within specified load test machine process limits for a specified load test machine configuration, thereby enabling a user to design and execute a subsequent load test using the load test machine usage data.

13. The computer of claim 12, further comprising a human interface to communicate to a person load test machine usage data collected and stored in memory and to receive test instructions from the person.

14. The computer of claim 12, wherein the memory further stores load test machine configuration data associated with the machine usage data, wherein the machine configuration data is also accessible by the user.

15. The computer of claim 12, wherein the processor further determines if a given number of users emulated by a load test machine will be within specified load test machine process limits.

16. The computer of claim 12, wherein the load test machine usage data comprises an average CPU usage.

17. The computer of claim 14, wherein the stored load test machine configuration data includes a type of processor of a load test machine.

18. A machine-accessible medium having instructions for performing load test functions, which, when the instructions are executed by a machine, cause said machine to perform operations for testing a server, comprising:
   receiving load test machine usage data from one or more load test machines; the load test machine usage data comprising a number of users that can be emulated by each load test machine within specified load test machine process limits;
   storing into a memory user-accessible load test machine usage data and associating the load test machine usage data with load test machine configuration data stored in the memory; and
   enabling a user to determine from the load test machine usage data, a number of users accessing a server that may be emulated by a load test machine within specified load test machine process limits for a specified load test machine configuration;
   enabling the user to design a subsequent load test using a user-selected configuration of one or more load test machines, the user selected configuration based on load test machine usage data stored in the memory; and
   emulating the determined number of users by the one or more load test machines to execute the designed subsequent load test, the emulating comprising generating multiple client-server sessions to emulate user interactions with the one or more servers.

19. The machine accessible medium of claim 18, further comprising determining a minimum number of load test machines to emulate a total number of users within specified load test machine process limits.

20. The machine accessible medium of claim 18, further comprising providing a display of load test machine configuration data and load test machine usage data.

21. The machine accessible medium of claim 20, further comprising enabling a user to choose among a plurality of configuration options for configuring load test machines for a load test.

\* \* \* \* \*